Oct. 27, 1959 H. J. G. SCHADE 2,910,181
COMBINED RAKE AND CRUSHING SYSTEM
Filed July 2, 1956 5 Sheets-Sheet 1

Inventor:
Harald Schade
Erwin Salzer
By                Atty.

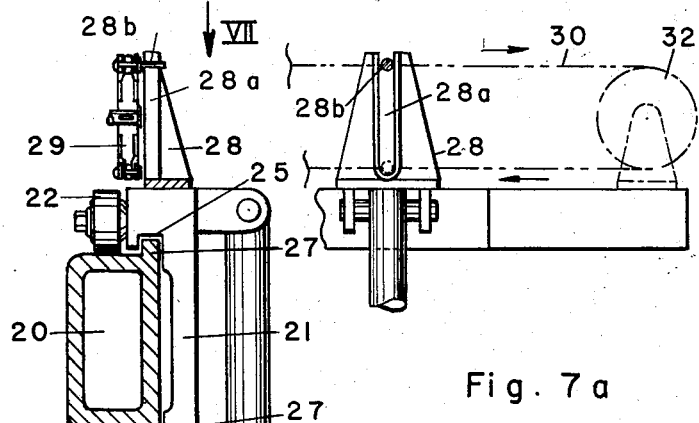
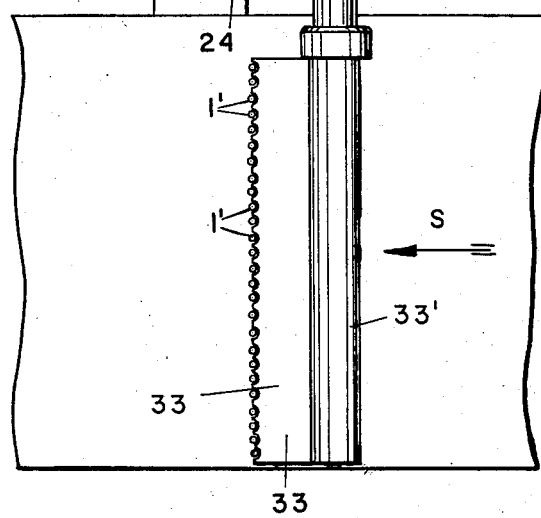
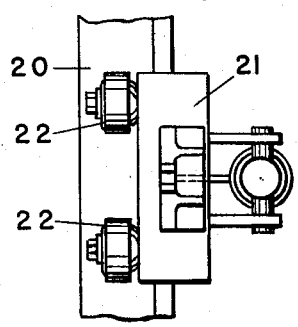

United States Patent Office 2,910,181
Patented Oct. 27, 1959

2,910,181

COMBINED RAKE AND CRUSHING SYSTEM

Harald Joachim Georg Schade, Stuttgart-Bernhausen, Germany, assignor to Passavant Werke, Michelbacher Huette, near Michelbach, Nassau, Germany Application July 2, 1956, Serial No. 595,555

8 Claims. (Cl. 210—162)

This invention relates to waste disposal in flowing bodies of water, or sewage disposal, and more particularly to separation of solid matter from water, and subsequent reduction of the size of such matter, irrespective of its original size and of its nature, to particles of very small size.

It is one object of this invention to provide improved systems of this character not subject to the drawbacks and limitations of prior art disposal systems.

One of the primary problems of waste or sewage disposal is automatic separation of solid foreign matter from a stream, or other body, of flowing water, and subsequent size reduction of such matter to such an extent as to enable pumping of mixtures of water and solid matter resulting from the re-admixture of such matter, whose size has been drastically reduced, to the body of water.

Separation of solid foreign matter from a stream, or other body of flowing water, is generally effected by rakes, either made up of systems of vertical rake bars, or of systems of horizontal rake bars.

It is another object of this invention to provide improved waste or sewage disposal systems including rakes of the horizontal bar type.

One type of rakes having horizontal bars are the drum-type rakes which are revolving rakes meshing with revolving cutting means for solid foreign matter retained by the rake drum. Such systems are only adapted to process solid foreign matter which can be cut, but are unable to handle, i.e. reduce the size, of such solid foreign matter as large pieces of wood, cans, stones, etc. The same is true of systems comprising rakes whose fixed bars are horizontal and mesh with cutting means oscillating in a direction longitudinally of the bars.

It is, therefore, still another object of this invention to provide waste or sewage disposal systems comprising fixed rakes of the horizontal bar type which systems are not subject to the limitations of prior art systems comprising rakes of the horizontal bar type.

A further object of this invention is to provide a simple, efficient automatic disposal system capable of removing foreign matter continuously, and of reducing the size of virtually any kind of foreign matter occurring in waste or sewage disposal, including such foreign matter as relatively large pieces of wood, cans, stones, etc.

Other objects and advantages of the invention will, in part, be obvious and in part appear hereinafter.

For a more complete understanding of the invention reference may be had to the following detailed description thereof taken in connection with the accompanying drawings, in which:

Fig. 6 is in part an elevational view and in part a sectional view of the sweeping mechanism forming part of the structure shown in Figs. 4 and 5;

Fig. 7 is a top plan view of the structure shown in Fig. 6;

Fig. 7a is a side elevation of the structure shown in Figs. 6 and 7;

Figure 1:
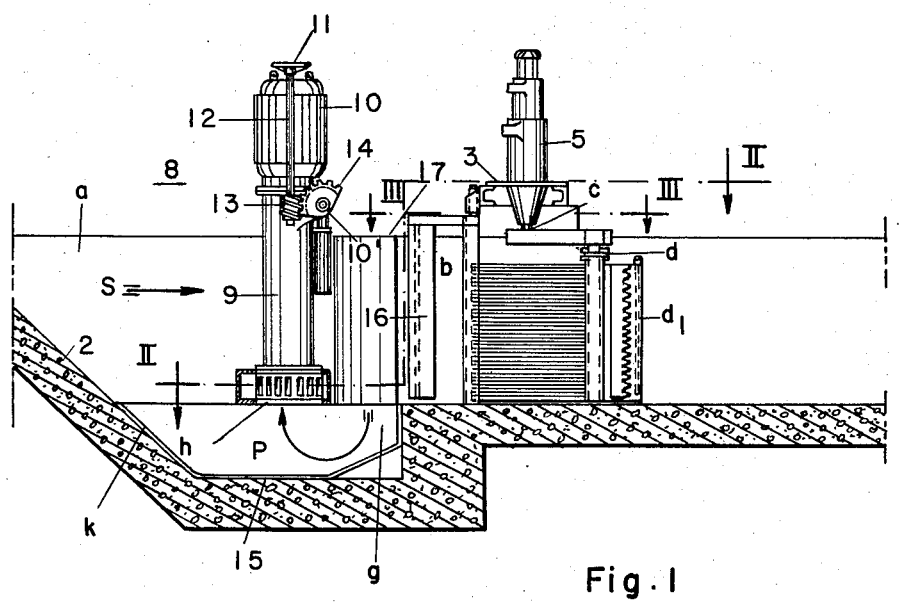
Fig. 1 is a section along I—I of Fig. 2 and shows a waste or sewage disposal system embodying the invention.
Figure 2:
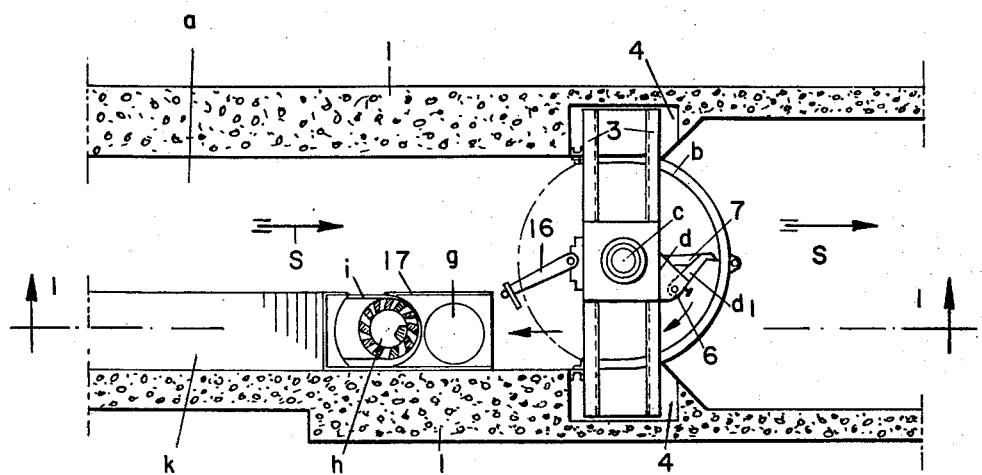
Fig. 2 is a section along II—II of Fig. 1.
Figure 3:
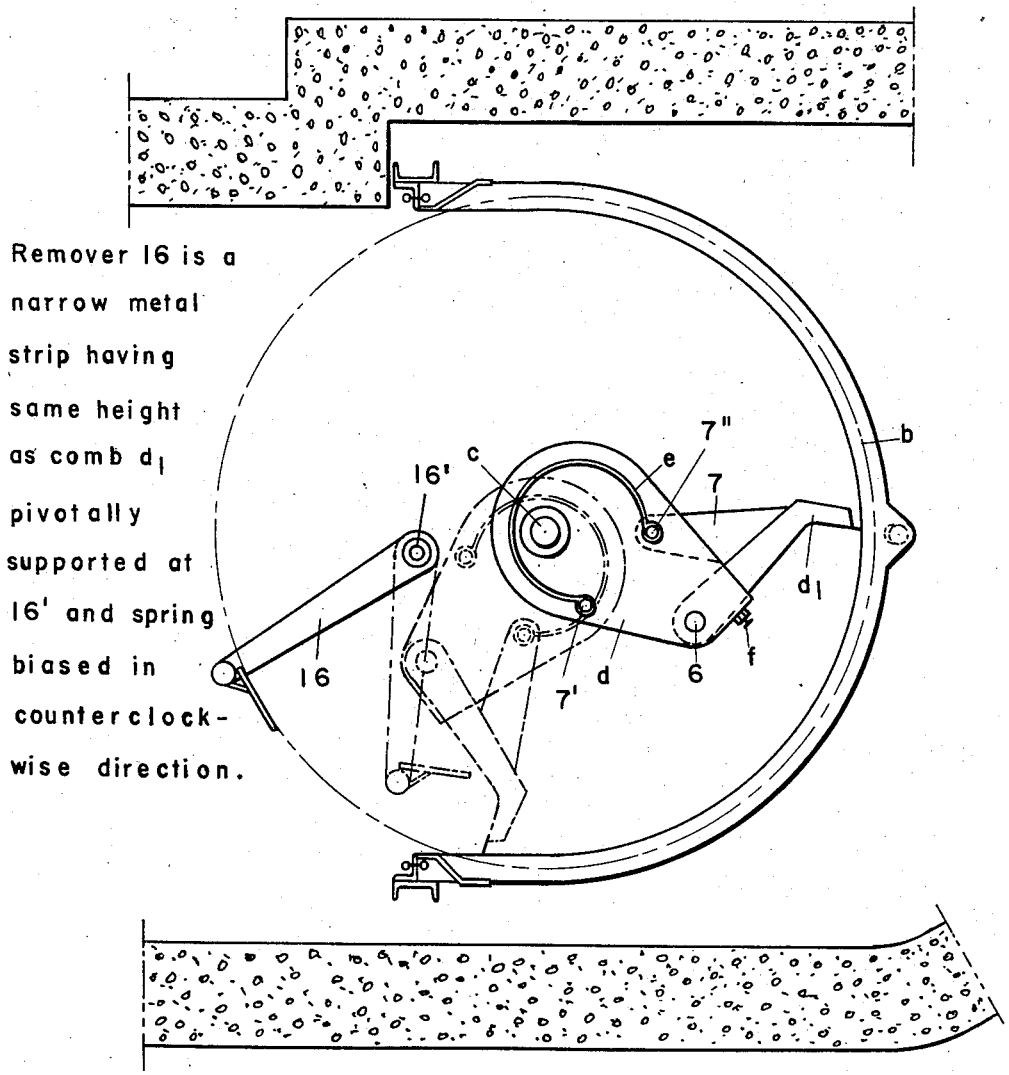
Fig. 3 is in substance a section along III—III of Fig. 1.

Referring now to the drawings, and more particularly to Figs. 1 to 3 thereof, reference numeral 1 has been applied to indicate the banks of a bed 2 for a flow of impure water $a$, the general direction of which has been indicated by the arrow S. The horizontal frame structure 3 extends in bridge-like fashion across bed 2, and is supported on each end thereof by pillars (not shown) arranged in recesses 4 of banks 1. A rake $b$ is arranged immediately below the frame 3. Rake $b$ is made up of a system of horizontal circular or similarly curved bars arranged substantially in the plane of a vertical cylindrical surface. Due to the shape of its constituent bars the shape of any horizontal cross-section of this surface is circular, and it defines a cavity extending in downstream direction of the flow of the body of water $a$ in bed 2. The vertical rotatable shaft $c$ is arranged in coaxial relation with said cylindrical surface, and supports sweeping device $d$, $d_1$ for removing solid foreign matter caught by rake $b$ from the rake. Sweeping device $d$, $d_1$ and its shaft $c$ are operated by an electric motor 5 supported by the bridge or frame structure 3. The driving shaft of motor 5 is arranged vertically in coaxial relation with the axis of the cylindrical rake $b$ and coupled with shaft $c$ thereof. The sweeping device $d$, $d_1$ comprises a comb $d_1$ which cooperates with the bars of rake $b$, i.e. whose teeth are in meshing engagement with the rake bars. Reference character $d$ indicates a plate structure mounted on shaft $c$ pivotally supporting the comb structure $d_1$ at 6. If desired shaft $c$ may extend along the entire height of rake $b$ and support a plate structure $d$ on each end thereof. Such an arrangement makes for increased dimensional stability. One end of U-shaped spring $e$ is attached to plate structure $d$ at 7' and the other end of spring $e$ is attached to lever 7 forming an integral part of comb $d_1$ at 7". Spring $e$ tends to push comb $d_1$ into firm yet yieldable engagement with rake $b$. Abutment $f$ forms a part of plate structure $d$, and limits pivotal movement of comb structure $d_1$ about pin 6 relative to plate structure $d$. Normally comb $d_1$ engages the rake $b$, and is spaced from abutment $f$. At a predetermined point of its rotary motion—in clockwise direction as seen in Fig. 3—comb $d_1$ disengages from rake $b$, and then abutment $f$ becomes operative to preclude excessive pivotal movement of comb $d_1$ relative to the supporting plate structure $d$ thereof. Foreign matter collected by rake $b$, and moved along rake $b$ by sweeping device $d$, $d_1$, drops to the bottom of bed 2 when the comb $d_1$ disengages from rake $b$. Reference numeral 8 has been applied generally to indicate a rotatable comminuting device or crushing type disposal device for the solid matter dropped at the point of disengagement of comb $d_1$ from rake $b$. Disposal device 8 comprises a vertical column 9 supporting an electric motor 10 at the top end thereof, and disposal or crushing and grinding tools $h$ at the bottom end thereof. Tools $h$ may be of any desired design, yet it is preferred to apply crushing and grinding tools of the character disclosed and claimed in my copending patent application Crushing Machine, filed July 2, 1956, Serial No. 595,556. Column 9 is adapted to be pivoted about fulcrum 10 to raise the crushing and grinding tools h above the level of water in bed 2 for purpose of inspection and maintenance of crushing and grinding tools h. To raise crushing and grinding tools h above the water level, hand wheel 11 mounted on shaft 12 is being operated. This causes rotation of worm 13 meshing with gear 14 and consequent pivotal movement of column 9 about fulcrum 10 in clockwise direction. Tilting of column 9 about fulcrum 10 is brought about by worm 13 climbing up or down fixed gear segment 14. The pivoting mechanism for crushing and grinding tools h has been more fully described and claimed in my copending patent application for Tiltable Underwater Machine Structure, filed July 2, 1956, Ser. No. 595,554, now Patent 2,860,835 issued November 18, 1958, and reference may be had to this patent for a more complete disclosure of the details of this mechanism. Disposal device 8 comprises further a suction intake g which is arranged immediately adjacent to the point where the solid matter combed out of rake b is being released, and allowed to drop to the bottom of bed 2. Suction intake g is at the level of the bottom of channel or bed 2. A cylindrical surface extends upwardly from intake g above the high water mark. The surface or barrier has a vertical slot extending along its entire length for lateral admission of solid foreign matter from the space outside said surface to the space bounded by, or situated inside of, said surface. As more fully described in the above referred to copending patent applications, a strong suction is produced by the rotary motion of the crushing and grinding tools h which causes solid matter combed out of rake b to enter suction intake g. From there such matter floated by currents of water follows a substantially U-shaped path indicated in Fig. 1 by the arrow marked P, and enters the crushing tool h from the open bottom thereof. Crushing tool h comprises a comminuting chamber arranged inside of channel 2 in fixed relation to rake b and at a higher lever than intake g. Solid matter crushed and ground in tool h is ejected through passage i back into channel or bed 2. Parts of solid matter crushed to relatively small size may then pass through the gaps formed between the constitutent horizontal bars of rake b, whereas relatively large parts are again retained by rake b, again swept or combed toward the suction intake g of the disposal device 8, and again crushed and ground by tools h. This cycle is repeated until substantially all solid matter is so much reduced in size as to be able to pass through the gaps formed between the bars of rake b.

Reference numeral 15 has been applied to indicate a chamber situated immediately below crushing and grinding tool h. Chamber 15 is defined by a receptacle recessed in the bottom of channel 2. The left side of chamber 15 as seen in Fig. 1 is open at the top and has a sloping bottom k. Large stones, chunks of metal, etc. which are beyond the crushing capacity of the disposal device 8 may be removed from time to time through the open top of chamber or sump 15 by dragging them with an appropriate tool, such as a hoe, along the sloping surface k to and above the level of the body of water a in bed 2. The top of the receptacle-defining chamber 15 is substantially flush with the bottom of bed or channel 2, and the comminuting or crushing chamber of tool h is arranged on the top of said receptacle.

In Fig. 3 two positions of the sweeping device d, $d_1$ have been shown. The position corresponding to the middle of its sweep along rake b has been indicated by solid lines, and the position corresponding to the end of its sweep along rake b has been indicated by dash-and-dot lines.

A resilient removed 16 for removing solid matter from comb $d_1$ may be arranged at the point where solid matter is supposed to be released into suction intake g of disposal device 8. Fig. 3 shows two positions of remover 16, one in solid lines, and one in dash-and-dot lines. Provision of remover 16 is optional. A partition or barrier 17 arranged adjacent to suction intake g precludes the stream of water in bed 2 from flushing away from suction intake g solid matter supposed to enter the suction intake g.

It will be apparent from the foregoing that solid foreign matter is being removed continuously from the stream of water flowing down in bed 2. The cylindrical configuration of rake b yields a large raking surface, yet impedes but little the flow of water in bed or channel 2.

The sump-forming duct defining means 15 has its horizontal intake opening g immediately adjacent to the end of rake b to which solid matter retained by the rake is being swept. Intake opening g is situated substantially at the lowest level of rake b. The horizontal outlet opening of duct defining means 15 is arranged relatively close to intake opening g and indicated in Fig. 1 by the head of arrow P. In other words, the path of water between intake opening g and the outlet opening of duct defining means 15 is relatively short. The rotatable suction type crushing and grinding device h is arranged substantially at the lowest level of rake b immediately above the outlet opening of duct defining means 15. The arrangement of crushing or grinding device h substantially on the floor level of the stream of water to be purified minimizes the suction action required of that device and minimizes also the danger of clogging by solid matter of the path of water to that device.

Referring now to Figs. 4 to 9, reference numeral 1' has been applied to indicate a system of horizontal bars making up a rake. The rake is arranged in a bed or channel 2 for a body of water flowing in the direction of arrow S. The rake-forming bars 1' are straight bars, extending transversely across channel 2, yet one end 18 of the rake is arranged downstream with respect to the opposite end 19 of the rake. Bridge 20 is arranged parallel to the rake bars 1' above the level of water in channel 2. Carriage 21 mounted on and supported by bridge 20 is adapted to be moved back and forth along bridge 20. To minimize friction carriage 21 is provided with rollers, or casters 22 rolling upon the upper surface of bridge 20. Carriage 21 forms two recesses 24, 25 adapted to be engaged by a pair of straight rails 27 forming integral parts of bridge 20, one being situated on the upper side and the other on the lower side of bridge 20. The top of carriage 21 supports a bracket 28 supporting, in turn, a mechanism 29 for coupling carriage 21 to a chain drive 30. Chain drive 30 comprises two sprockets 31, 32 arranged on opposite banks of channel 2, and adapted to be operated by motor means (not shown) to move chain 30 continuously in one direction. Carriage 21 forms an integral part of a sweeping device comprising a comb 33 whose teeth mesh with the rake formed by bars 1'. Thus foreign matter collected by the rake is being swept along bars 1', in the direction from the upstream end 19 of the rake to its downstream end 18. Bracket 28 is provided with a vertical slot 28a forming guide means for pin 28b slidably arranged therein. Pin 28b is under the control of a mechanism (not shown) shifting pin 28b from its upper position to its lower position in slot 28a any time carriage 21 reaches one end of its track formed by bridge 20. Pin 28b is a means for coupling carriage 21 to chain drive 30. If pin 28b is in the upper position thereof it couples carriage 21 to the upper portion of chain 30 and causes movement of carriage 21 in one direction along bridge 20. Upon shifting of pin 28b along slot 28a to the other limit position thereof it couples carriage 21 to the lower portion of chain 30 and causes movement of carriage 21 in the opposite direction along bridge 20. Comb 33 may remain in meshing engagement with the bars 1' of the rake while reciprocating across the body of water to be freed from bulky solid matter. To enable this comb 33 ought preferably to be slightly bent. This causes comb 33 to sweep the rake when being moved in one direction by chain drive 30, but of more or less sliding over matter retained by the rake when being moved by chain drive 30 in the opposite direction. It may happen that a few parts may be removed by comb 33 from the rake during the movement of the former away from suction intake g. This is of no moment since such matter will be re-floated against the rake, retained by it and then swept toward suction intake g.

As an alternative, comb 33 may be provided with means enabling the latter to pivot about 33' to two limit positions. In one of these positions comb 33 would be ineffective as a sweeping device and out of mesh with the rake, and in the other position it would be effective. Such an arrangement calls for the provision of an appropriate control linkage (not shown) for comb 33 to move the latter to either of its two limit positions any time carriage 21 reaches one end of its track. Reference numeral 8 has been applied to generally designate a disposal device of the same character as described in connection with Figs. 1 and 2, comprising a motor 10 on top of column 9, and a crushing and grinding tool h driven by motor 10 arranged at the bottom of column 9. Column 9 is adapted to be pivoted about fulcrum 10' by means of hand wheel 11, worm 13, and gear 14 meshing with worm 13. The disposal device 8 further comprises the aforementioned suction intake g for the crushing and grinding tool h.

Figure 4:
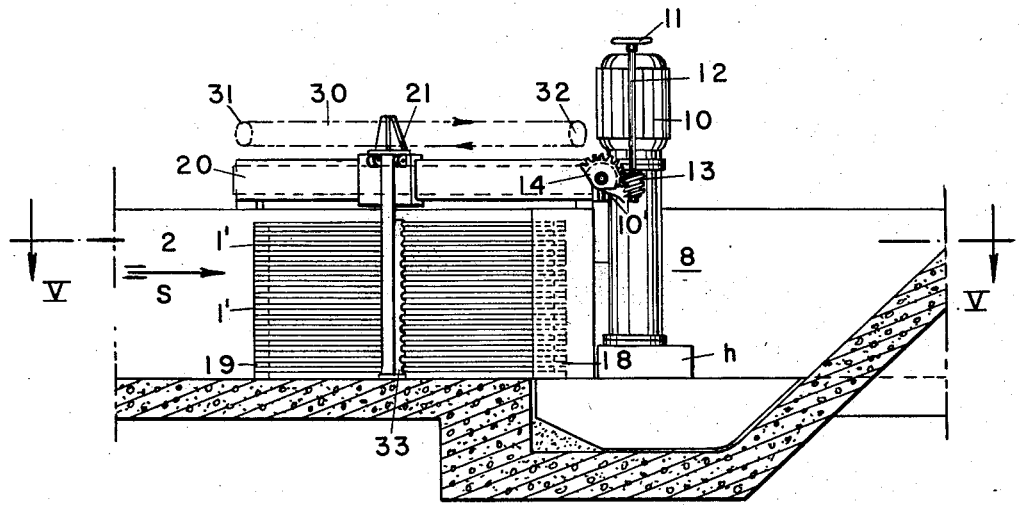
Fig. 4 is a section along IV—IV of Fig. 5 and illustrates another sewage disposal system embodying the invention.
Figure 5:
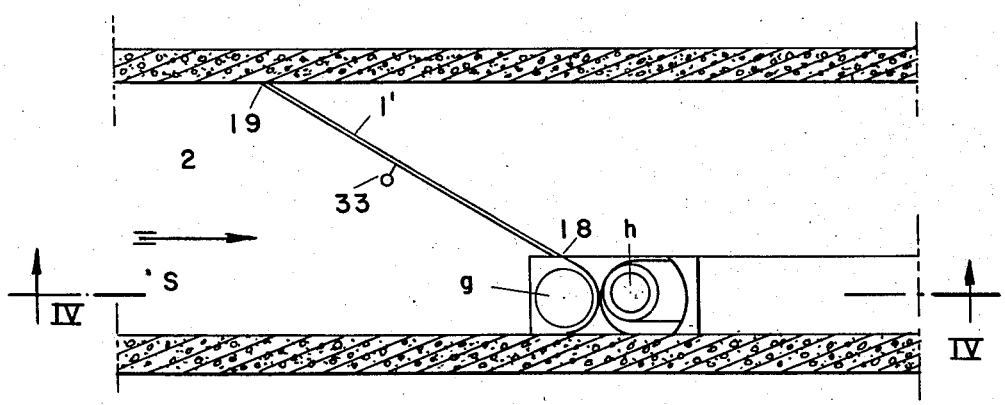
Fig. 5 is a section along V—V of Fig. 4.
Figure 8:
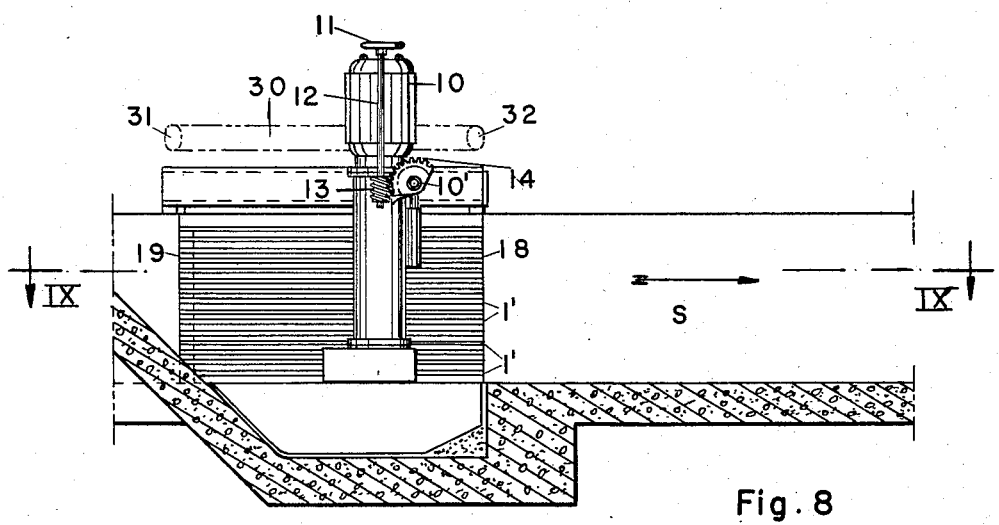
Fig. 8 is a section along VIII—VIII of Fig. 9 and illustrates a third disposal system embodying the invention.
Figure 9:
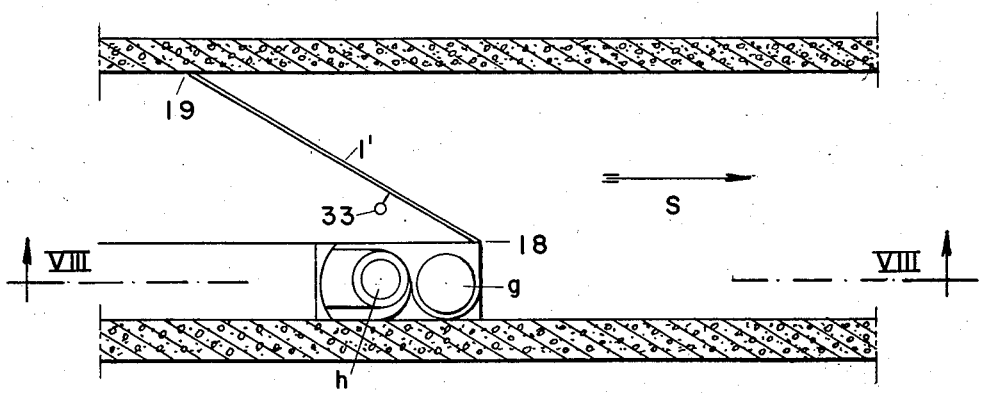
Fig. 9 is a section along IX—IX of Fig. 8.

In the arrangement of parts shown in Figs. 4 and 5 the disposal device proper including its comminuting chamber and column 9 is arranged at a point downstream from its suction intake g' whereas in the arrangement of parts shown in Figs. 8 and 9 the disposal device proper including its comminuting chamber and column 9 is arranged at a point upstream of suction intake g.

All embodiments of the invention shown have the advantage of providing a relatively large rake surface compared to the cross-sectional area of channel 2 without seriously impeding the flow of water therein. The arrangement of the constituent parts of the system is simple. The cost of building the channel are relatively low because the channel walls are substantially plane and the installation of the system calls but for a short length of increased width.

It will be understood that although but three embodiments of the invention have been shown and described in detail, the invention is not limited thereto. It will also be understood that the structures illustrated may be modified without departing from the spirit and scope of the invention as set forth in the accompanying claims.

It is claimed:

1. A water purification system comprising means defining a channel for a flowing body of water to be purified, said channel-defining means including a pair of lateral walls and a bottom wall, a rake formed by a system of horizontal spaced fixed bars inside said channel extending across said channel substantially from one of said pair of lateral walls to the other of said pair of lateral walls, a horizontally movable sweeping device in cooperative meshing engagement with said rake adapted to sweep foreign matter retained by said rake horizontally along said rake and to concentrate foreign matter at a point of said channel adjacent one of said pair of lateral walls, and a rotatable comminuting device for foreign matter, said device comprising intake means arranged adjacent said point substantially at the level of said bottom wall, a comminuting chamber arranged inside said channel in fixed relation to said rake at a higher level than said intake means, and suction means for establishing a flow of water from said point through said intake means and said comminuting chamber.

2. A water purification system comprising means defining a channel for a flowing body of water to be purified, a rake formed by a system of horizontal spaced fixed bars inside said channel extending across said channel, a horizontally movable sweeping device in cooperative meshing engagement with said rake adapted to sweep foreign matter retained by said rake horizontally along said rake and to concentrate foreign matter at a point of said channel adjacent to one of the ends of said rake, a receptacle recessed in the bottom of said channel and having a top substantially flush with said bottom, and a rotatable comminuting device for foreign matter, said device including an intake opening formed in said top of said receptacle, a comminuting chamber arranged inside said channel in fixed relation to said rake above said top of said receptacle, and suction means for establishing a flow of water from said point through said intake opening, said receptacle and said comminuting chamber.

3. A water purification system comprising means defining a channel for a flowing body of water to be purified, a rake formed by a system of horizontal spaced bars in said channel extending across said channel, a horizontally movable sweeping device in meshing cooperative engagement with said rake adapted to sweep foreign matter retained by said rake horizontally along said rake and to concentrate foreign matter at a point of said channel immediately adjacent one end of said rake, and a rotatable comminuting device arranged at a point of said channel situated upstream of said rake, said device comprising intake means arranged adjacent said point substantially at the level of the bottom of said channel, a comminuting chamber arranged inside said channel in fixed relation to said rake at a higher level than said intake means, and suction means for establishing a flow of water from said point through said intake means and said comminuting chamber.

4. A water purification system comprising means defining a channel for a flowing body of water to be purified, said channel-defining means including a pair of lateral walls and a bottom wall, a rake formed by a system of horizontal spaced fixed bars situated in a semi-cylindrical plane having a vertical axis situated inside said channel, said plane extending across said channel substantially from one of said pair of boundary walls to the other of said pair of boundary walls, a rototable comb in cooperative meshing engagement with said rake, said comb having a vertical axis of rotation coextensive with said vertical axis of said semi-cylindrical plane, means for rotating said comb along said rake and out of meshing engagement with said rake at a point thereof situated adjacent one of said pair of lateral walls, a remover for foreign matter arranged adjacent said point cooperating with said comb to remove foreign matter therefrom, and a rotatable comminuting device for foreign matter, said device comprising intake means arranged immediately adjacent said point substantially at the level of said bottom wall, a comminuting chamber arranged inside said channel in fixed relation to said rake at a higher level than said intake means, and suction means for establishing a substantially U-shaped flow of water through said intake means and said comminuting chamber.

5. A water purification system comprising means defining a channel for a flowing body of water to be purified, a rake formed by a system of horizontal spaced fixed bars situated in a semi-cylindrical plane extending across said channel and having a vertical axis situated inside said channel, a rotatable comb in cooperative meshing engagement with said rake, said comb having a vertical axis of rotation coextensive with said vertical axis of said semi-cylindrical plane, spring means for yieldingly maintaining said comb in said meshing engagement with said system, means for causing said comb to concentrate foreign matter at a point of said channel adjacent one of the ends of said rake, said concentrating means including a remover for foreign matter adapted to cooperatively engage said comb, and a rotatable comminuting device for foreign matter, said device comprising intake means arranged immediately adjacent said point substantially at the level of the bottom of said channel, a comminuting chamber arranged inside said channel in fixed relation to said rake at a higher level than said intake means, and suction means for establishing a substantially U-shaped flow of water through said intake means and said comminuting chamber.

6. A water purification system comprising means defining a channel for a flowing body of water to be purified, a rake formed by a system of horizontal spaced fixed bars situated in a vertical plane extending across said channel at an acute angle to the general direction of said channel at the point thereof where said rake is located, a horizontally movable sweeping device in cooperative engagement with said rake adapted to sweep foreign matter along said rake and to concentrate foreign matter at the downstream end thereof, and a rotatable comminuting device for foreign matter, said device comprising an intake means arranged adjacent said downstream end substantially at the level of the bottom of said channel, a comminuting chamber arranged inside said channel in fixed relation to said rake at a higher level than said intake means, and suction means for establishing a substantially U-shaped flow of water through said intake means and said comminuting chamber.

7. A water purification system as specified in claim 6 wherein said comminuting chamber is arranged at a point of said channel situated upstream from said intake means.

8. A water purification system as specified in claim 6 wherein said comminuting chamber is arranged at a point of said channel situated downstream from said intake means.

References Cited in the file of this patent
UNITED STATES PATENTS

| | | |
|---|---|---|
| 2,106,851 | Nordell | Feb. 1, 1938 |
| 2,358,841 | Walker | Sept. 26, 1944 |
| 2,672,895 | Nordell | Mar. 23, 1954 |

OTHER REFERENCES

Dorr-Oliver Inc., Bulletin No. 6400, page 12–17, pub. 1952.